United States Patent
Dudgeon et al.

(10) Patent No.: US 9,372,643 B2
(45) Date of Patent: Jun. 21, 2016

(54) DATA SET MANAGEMENT

(71) Applicant: International Business Machines Corporation, Armonk, NY (US)

(72) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 13/861,741

(22) Filed: Apr. 12, 2013

(65) Prior Publication Data

US 2014/0310454 A1 Oct. 16, 2014

(51) Int. Cl.
*G06F 3/06* (2006.01)

(52) U.S. Cl.
CPC .......... *G06F 3/0689* (2013.01); *G06F 3/0604* (2013.01); *G06F 3/067* (2013.01); *G06F 3/0607* (2013.01); *G06F 3/0608* (2013.01); *G06F 3/0631* (2013.01); *G06F 3/0644* (2013.01)

(58) Field of Classification Search
None
See application file for complete search history.

(56) References Cited

U.S. PATENT DOCUMENTS

| | | | | |
|---|---|---|---|---|
| 5,802,599 A | * | 9/1998 | Cabrera | G06F 3/0611 711/100 |
| 5,930,828 A | * | 7/1999 | Jensen | G06F 3/0608 360/48 |
| 6,047,360 A | * | 4/2000 | Claar | G06F 3/0613 704/278 |
| 6,405,284 B1 | | 6/2002 | Bridge | |
| 7,146,475 B2 | | 12/2006 | Perego | |
| 8,086,810 B2 | | 12/2011 | Huber et al. | |
| 2001/0047454 A1 | * | 11/2001 | Soderstrom | G06F 3/0605 711/118 |
| 2005/0108485 A1 | * | 5/2005 | Perego | G06F 3/0607 711/162 |
| 2006/0265426 A1 | * | 11/2006 | Chen | G06F 17/30067 |
| 2010/0185829 A1 | | 7/2010 | Dudgeon et al. | |
| 2011/0161560 A1 | * | 6/2011 | Hutchison | G06F 12/0246 711/103 |
| 2011/0208705 A1 | * | 8/2011 | Hansma | G06F 17/3015 707/697 |
| 2011/0208716 A1 | * | 8/2011 | Liu | G06F 17/30247 707/710 |
| 2012/0131293 A1 | | 5/2012 | Benhase et al. | |
| 2012/0317349 A1 | * | 12/2012 | Tonami | G06F 3/0611 711/103 |
| 2013/0103920 A1 | * | 4/2013 | Wei | G06F 17/30091 711/173 |
| 2013/0124585 A1 | * | 5/2013 | Suzuki | G06F 11/1076 707/822 |

OTHER PUBLICATIONS

IBM, "Extent Consolidation with Relocation", IP.com Prior Art Database. Published Nov. 11, 2008. IP.com No. IPCOM000176290D.

* cited by examiner

*Primary Examiner* — Yaima Rigol
(74) *Attorney, Agent, or Firm* — Peter J. Edwards; Robert Sullivan

(57) ABSTRACT

A method of and system for managing a data set stored on units of storage space in a storage facility is disclosed. The method and system may include identifying prospect extents of the data set. The prospect extents may include a first prospect extent stored on a first unit of storage space and a second prospect extent stored on a second unit of storage space. The method and system may include congregating the first prospect extent and the second prospect extent on a destination unit of storage space in the storage facility.

19 Claims, 4 Drawing Sheets

DATA SET MANAGEMENT

TECHNICAL FIELD

This disclosure relates generally to computer-implemented data storage and, more particularly, relates to consolidating data sets.

BACKGROUND

The amount of data that needs to be managed by enterprises is growing at an extremely high rate. One challenge facing database management systems is a data set spread across a large quantity of units of storage space (e.g., volumes). Typically, a customer of a database management service must copy the entire data set, or migrate it to tape and recall it to a Direct Access Storage Device (DASD), in order to consolidate the large quantity of volumes on which the data set resides.

SUMMARY

A method of and system for managing a data set stored on units of storage space in a storage facility is disclosed. The method and system may include identifying prospect extents of the data set. The prospect extents may include a first prospect extent stored on a first unit of storage space and a second prospect extent stored on a second unit of storage space. The method and system may include congregating the first prospect extent and the second prospect extent on a destination unit of storage space in the storage facility.

Aspects of the disclosure may include a method to congregate portions of multivolume data sets without requiring the entire data set to be moved. Existing portions of the data sets that may be congregated may be termed prospect extents. In embodiments, data sets with large quantities of extents may be analyzed. Prospect extents storing data may be identified. The prospect extents may be small extents spread across multiple units of storage space which may be volumes. The prospect extents may be consecutive extents. The data set may be serialized. Prospect extents, typically small extents, may be combined. Large extents may or may not be included. A region within a storage group may be scanned for a large amount of space on a single unit of storage space (e.g., volume). Prospect extents may be congregated from multiple units of storage space to the single unit of storage space. Aspects of the disclosure may result in consolidation of selected multiple volume data sets by congregating extents of data sets having the highest number of volumes and the smallest extents.

DETAILED DESCRIPTION

In available database management solutions a data set may be stored in one or more units of storage space (e.g., volumes). In each unit of storage space a particular database management solution may include allocations of storage space known as extents. The maximum quantity of units of storage space permitted for the data set may be a predetermined value or may be user specified. As the amount of available storage decreases, extents of the data set may become spread across a large quantity of units of storage space. This may be particularly true when only a small quantity of free space exists on any individual unit of storage space. Resulting challenges may be faced. For example, a need for additional storage to keep unit of storage space information may exist. Similarly, additional processing overhead to handle data sets spread across the large quantity of units of storage space may arise.

Aspects of the disclosure may include a method to congregate portions of multivolume data sets without requiring the entire data set to be moved. Existing portions of the data sets that may be congregated may be termed prospect extents. In embodiments, data sets with large quantities of extents may be analyzed. Prospect extents storing data may be identified. The prospect extents may be small extents spread across multiple units of storage space which may be volumes. The prospect extents may be consecutive extents. The data set may be serialized. Prospect extents, typically small extents, may be combined. Large extents may or may not be included. A region within a storage group may be scanned for a large amount of space on a single unit of storage space (e.g., volume). Prospect extents may be congregated from multiple units of storage space to the single unit of storage space. Aspects of the disclosure may result in consolidation of selected multiple volume data sets by congregating extents of data sets having the highest number of volumes and the smallest extents.

Figure 1:
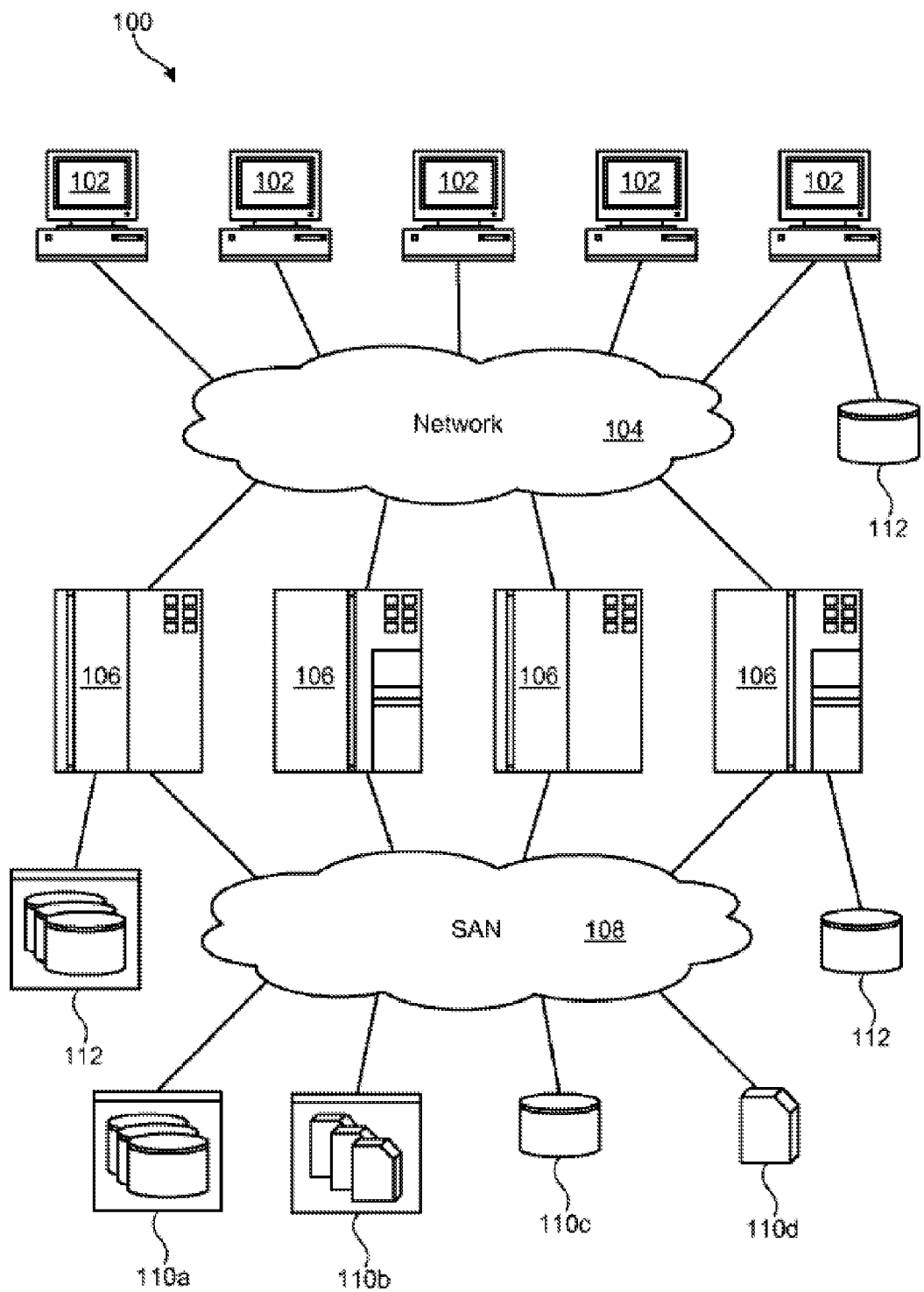
FIG. 1 illustrates an example network architecture according to an embodiment.

FIG. 1 illustrates an example network architecture 100 according to an embodiment. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from consolidation techniques of the disclosure.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from consolidation techniques according to the disclosure.

Figure 2:
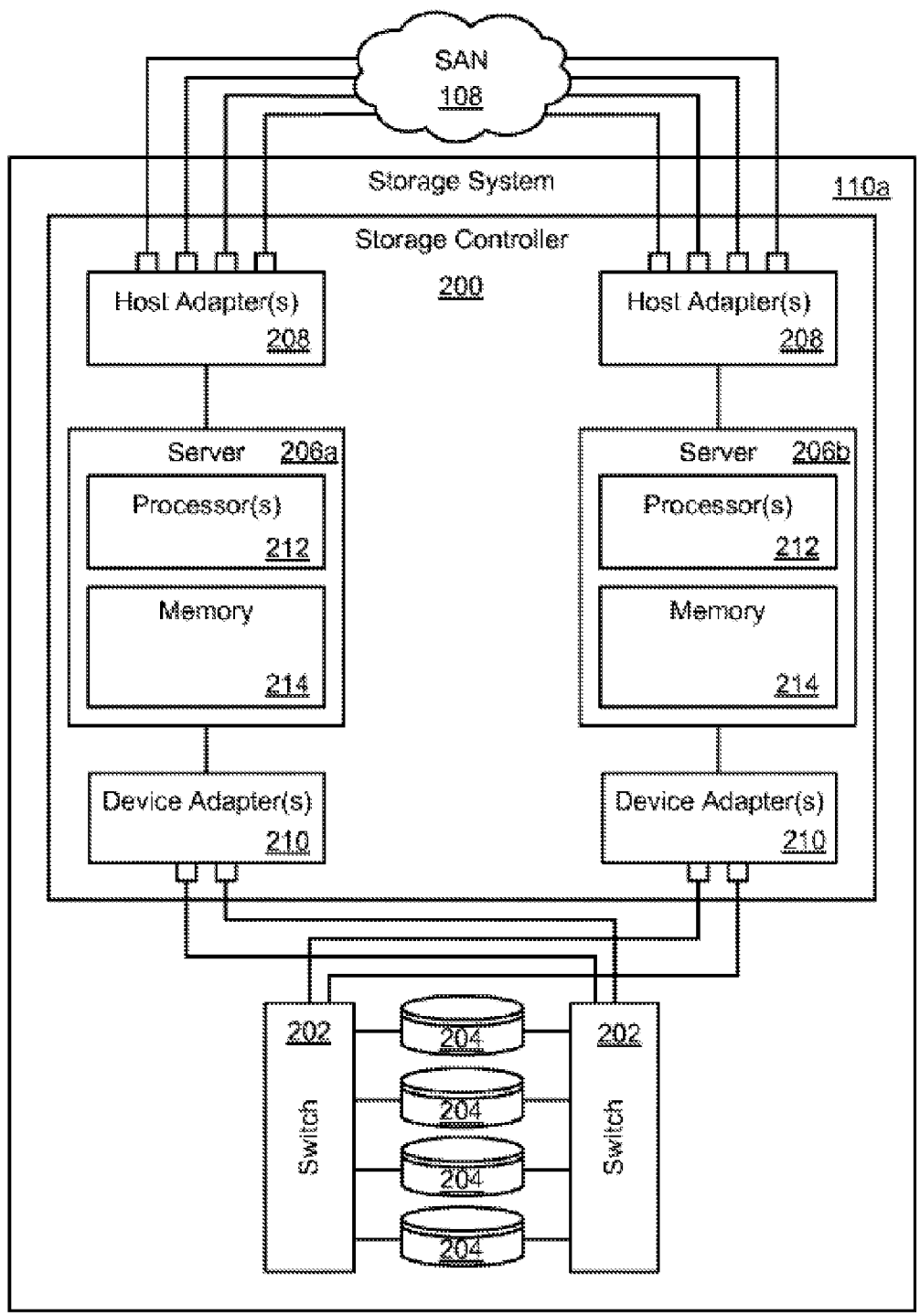
FIG. 2 illustrates an example storage system containing an array of storage devices according to an embodiment.

FIG. 2 illustrates an example storage system 110a containing an array of storage devices 204 (e.g., hard-disk drives 204 and/or solid-state drives 204) according to an embodiment. The internal components of the storage system 110a are shown as consolidation techniques according to the disclosure and may be used to consolidate data sets for logical volumes residing within such a storage system 110a. Nevertheless, consolidation techniques according to the disclosure may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, consolidation techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from consolidation techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
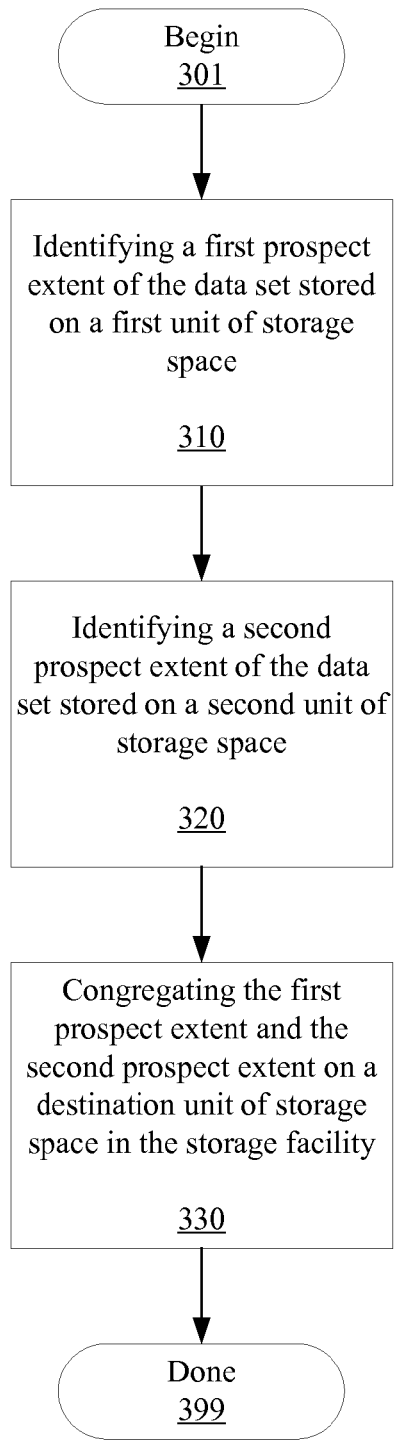
FIG. 3 is a flowchart illustrating an operation consolidating a data set according to an embodiment.

FIG. 3 is a flowchart illustrating an operation 300 consolidating a data set according to an embodiment. The data set may be stored on units of storage space (e.g., volumes). The unit of storage space may be for a file system. The unit of storage space may be in a storage facility. Each unit of storage space may be separately managed. Operation 300 may congregate portions of multivolume data sets without requiring the entire data set to be moved. In embodiments, congregating may include at least one of accumulating, aggregating, allocating, assimilating, bundling, caching, combining, compiling, connecting, consolidating, coupling, grouping, incorporating, joining, linking, merging, organizing, serializing, storing, unifying, and uniting. Such terms may be used interchangeably herein. Operation 300 may decrease the need for additional storage to keep volume information. Operation 300 may decrease processing overhead by managing data sets spread across the large quantity of units of storage space. Operation 300 may work on a variety of operating systems. In embodiments, operation 300 may work on database management solutions. Operation 300 may begin at block 301.

In embodiments, operation 300 may include scanning a catalog. The scanning of the catalog may be periodic. The catalog may provide information on data sets stored in units of storage space. The catalog may be utilized to organize and locate data sets. The catalog may include a specific data set containing information required to locate other data sets. Data sets with units of storage space that exceed a unit of storage space quantity threshold may be detected. The unit of storage space quantity threshold may be a boundary value for a quantity of units on which the data set may reside. The maximum quantity of units permitted for the data set may be a predetermined value or may be user specified. For example, a default unit of storage space quantity threshold may be 20 volumes. Performing operation 300 when the unit of storage space quantity threshold is exceeded may decrease processing overhead more significantly than doing so when the unit of storage space quantity threshold is not exceeded.

In embodiments, operation 300 may include an analysis of a data set. Data sets may exceed an extent quantity threshold. The extent quantity threshold may be a boundary value for a number of extents. The number of extents may be for the data set. The boundary value may be a maximum value. Upon reaching or exceeding the maximum value, operation 300 may be performed. The extent quantity threshold may be a predetermined value or may be user specified. The data set may have a large quantity of extents. The large quantity of extents may decrease processing overhead more significantly than performing operation 300 on a different data set with a small quantity of extents.

Prospect extents may be identified at blocks 310 and 320. Prospect extents may include portions of the data set which may be existing extents storing data. A first prospect extent of the data set stored on a first unit of storage space may be identified at block 310. A second prospect extent of the data set stored on a second unit of storage space may be identified at block 320. In embodiments, the prospect extents may include existing extents storing data that, when congregated, may increase efficiency of use of the data set.

The prospect extents may be small extents spread across multiple units of storage space. Either the first prospect extent or the second prospect extent may be below a prospect extent size threshold. The prospect extent size threshold may be a boundary value for a dimension, measurement, or amount of a particular extent associated with a unit of storage space. The prospect extent size threshold may be a predetermined value or may be user specified. Large extents may or may not be included in operation 300. Data sets with smaller extents spread across multiple units of storage space may be chosen for congregation.

The prospect extents may be consecutive extents. Consecutive extents may indicate a relationship between the first prospect extent and the second prospect extent. The relationship may indicate a pairing which may be contiguous or continuous. The relationship may include corresponding tracks for the pairing. The pairing may be associated via sequential timing, addressing, or other ordering. The data set may be serialized. Serializing the data set may assist in determining extents that are consecutive. In embodiments, extents may be identified in a manner such that data within the data set may have an order of the data preserved upon congregation. Accordingly, the first prospect extent and the second prospect extent may be consecutive. In embodiments, small consecutive extents may be identified for congregation in operation 300.

At least one of the first and second units of storage space may be below a space occupation threshold. The space occupation threshold may be a boundary value for a dimension, measurement, or amount of storable area filled on a unit of storage space which may be associated with a particular data set. The space occupation threshold may be a predetermined value or may be user specified. The space occupation threshold may serve to identify prospect extents on units of storage space with less data that may need to be moved. For example, a default space occupation threshold may include data sets having less than 100 cylinders worth of space on each volume they occupy. Data sets having at least 100 cylinders worth of space on each volume they occupy may be excluded from being chosen for congregation. Thus, data sets having smaller than 100 cylinders existing on multiple volumes may be chosen for congregation. Moving data sets occupying less space may be efficient compared to moving data sets occupying more space. Other possibilities for identifying prospect extents such as those related to extent size, ordering, and space occupation are contemplated.

The first prospect extent and the second prospect extent may be congregated on a destination unit of storage space in the storage facility at block 330. Congregating may include at least one of accumulating, aggregating, allocating, assimilating, bundling, caching, combining, compiling, connecting, consolidating, coupling, grouping, incorporating, joining, linking, merging, organizing, serializing, storing, unifying, and uniting. In embodiments, operation 300 may include a region within a storage group being scanned for a large amount of space on a single unit of storage space. Prospect extents may be congregated from multiple units of storage space to the single unit of storage space. The single unit of storage space may be the destination unit of storage space. In embodiments, the data may be FlashCopied or moved via host input-output (I/O). After the data is moved, the information in a volume table of contents (VTOC) and catalog may be updated to reflect the new allocation.

In example embodiments, more than one target extent may be used if not all of the small consecutive extents can be combined into a single extent. More than one target extent of the small consecutive extents may have large extents between them. For example, extent 1, extent 2, and extent 3 that are small extents may be followed by extent 4 which may be a very large extent may be followed by extent 5, extent 6, and extent 7 that are small extents again spread on other volumes. In such a case extents 1, 2, and 3 would be combined and extents 5, 6, and 7 would be combined while extent 4 could remain as is.

After the data is moved, the information in the VTOC and catalog may be updated to reflect the new allocation. The old extents may be removed and the information in the VTOC and catalog related to those no longer existing extents may be removed. Serialization may be released. The data set may have then been consolidated to a fewer number of volumes without having to move the entire data set.

In embodiments, the units of storage space may each have an unoccupied space amount. Operation 300 may select the destination unit of storage space to be the one of the units of storage space having the largest unoccupied space amount of the units of storage space. Such selection may permit prospect extents to be congregated efficiently among the units of storage space on the destination unit of storage space. In embodiments, the destination unit of storage space may be the first unit of storage space. In such scenario, the second prospect extent may be moved to the first unit of storage space which is the destination unit of storage space while the first prospect extent remains on the first unit of storage space. In example embodiments, it is possible for some of the extents to be on a same unit of storage space, in which case congregation to another unit of storage space may occur if the extents can be combined with other small extents from different units of storage space. For example, extent 5 is on volume A, extent 6 and extent 7 are on volume B, and extent 8 is on volume C. If these are each small extents, they may be combined into a single extent on a single volume. They may also be congregated into several extents on a single volume. Other possibilities are contemplated such as the first unit of storage space, the second unit of storage space, and the destination unit of storage space being the same unit of storage space. Altogether, operation 300 illustrates that aspects of the disclosure may result in consolidation of selected multiple unit of storage space data sets by congregating extents of data sets having the largest quantity of units of storage space and the smallest extents.

Figure 4:
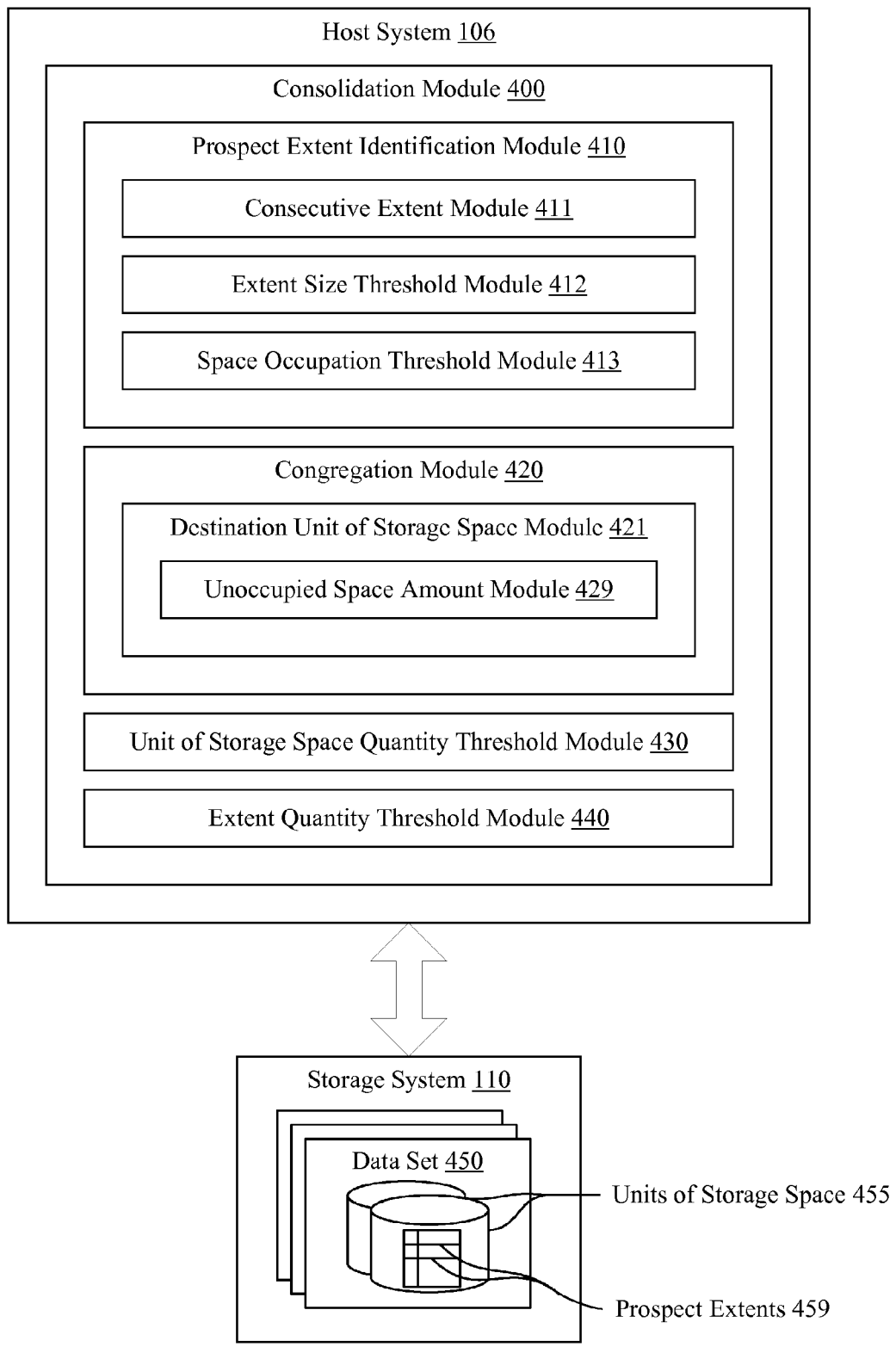
FIG. 4 shows modules of a system implementing an operation according to an embodiment.

FIG. 4 shows modules of a system implementing operation 300 according to an embodiment. In embodiments, operation 300 may be implemented in the form of one or more modules. These modules may be implemented in hardware, software or firmware executable on hardware, or a combination thereof. For example, module functionality may occur in a host system 106 may actually be implemented in a storage system 110 and vice versa. Other functionality may be distributed across the host system 106 and the storage system 110.

A host system 106 may include a consolidation module 400. The consolidation module and related aspects may take the form of a hardware embodiment, a software embodiment (including firmware, resident software, micro-code, etc.), or an embodiment combining software and hardware aspects. The consolidation module 400 may facilitate management of a storage system 110 hosting a data set 450 comprising units of storage space 455 adapted to have extents which may be prospect extents 459. The units of storage space 455 may be volumes. The consolidation module 400 may include a prospect extent identification module 410, a congregation module 420, a unit of storage space quantity threshold module 430, and an extent quantity threshold module 440. The prospect extent identification module 410 may include a consecutive extent module 411, an extent size threshold module 412, and a space occupation threshold module 413. The congregation module 420 may include a destination unit of storage space module 421 which may include an unoccupied space amount module 429.

The prospect extent identification module 410 may identify prospect extents including a first prospect extent of the data set stored on a first unit of storage space and a second prospect extent of the data set stored on a second unit of storage space. The consecutive extent module 411 may include the prospect extents being in an order which may be serialized. The extent size threshold module 412 may include the prospect extents being smaller extents. The space occupation threshold module 413 may serve to identify prospect extents on units of storage space with less data that may need to be moved.

The congregation module 420 may congregate the first prospect extent and the second prospect extent on a destination module in the storage facility. The destination unit of storage space module 421 may include unoccupied space to which the prospect extents may be congregated. The unoccupied space amount module 429 may include the largest unoccupied space amount of the units of storage space. The unit of storage space quantity threshold module 430 may include the maximum quantity of units of storage space permitted for the data set. The extent quantity threshold module 440 may include a quantity of extents needed to make performing an operation such as operation 300 efficient.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer implemented method of managing a data set stored on units of storage space in a storage facility, the method comprising:

selecting a first set of extents in the data set for congregation, wherein each extent in the first set of extents is selected based on being below an extent size threshold;

identifying a second set of extents in the data set, wherein the second set of extents is not selected for congregation; and congregating a first extent in the first set of extents and a second extent in the first set of extents on a destination unit of storage space in the storage facility, the congregating comprising:

moving the first extent from a first unit of storage space to the destination unit of storage space; and maintaining locations of the second set of extents.

2. The method of claim 1, wherein the first and second extents are consecutive extents.

3. The method of claim 1, wherein the first unit of storage space is below a space occupation threshold.

4. The method of claim 1, further comprising determining the units of storage space exceed a unit of storage space quantity threshold.

5. The method of claim 1, further comprising determining the data set exceeds an extent quantity threshold.

6. The method of claim 1, wherein the destination unit of storage space includes an unoccupied space amount which is the largest unoccupied space amount of the units of storage space.

7. The method of claim 1, wherein the second extent is located on the destination unit of storage space.

8. The method of claim 1, wherein a third extent in the second set of extents is located on the destination unit of storage space.

9. A method comprising:

selecting a data set;

selecting a first set of extents in the data set for congregation, wherein each extent in the first set of extents is selected based on being below an extent size threshold;

selecting a second set of extents in the data set, wherein each extent in the second set of extents is selected to remain at an address on a unit of storage space based on being above the extent size threshold; and congregating the first set of extents, the congregating comprising:

moving a first extent in the first set of extents from a source unit of storage space to a destination unit of storage space; and maintaining the addresses of the extents in the second set of extents.

10. The method of claim 9, wherein the data set is selected based on the data set being spread across a quantity of units of storage space that is above a unit of storage space quantity threshold.

11. The method of claim 9, further comprising serializing the data set to determine a sequential order of data within the data set prior to the congregating.

12. The method of claim 11, wherein moving the first extent causes the first extent to be consecutive with a second extent such that the determined sequential order of data is reflected by a physical order of the first extent and the second extent on the destination unit of storage space.

13. The method of claim 12, further comprising combining the first extent and the second extent into a single extent after moving the first extent.

14. The method of claim 13, wherein selecting the first extent in the first set of extents for congregation is further based on the source unit of storage space containing a quantity of extents that is above an extent quantity threshold.

15. The method of claim 9, wherein each extent in the first set of extents is further selected based on being consecutive on a unit of storage space with another extent in the first set of extents.

16. The method of claim 9, wherein the first extent in the first set of extents is moved based on the source unit of storage space being below a space occupation threshold.

17. The method of claim 9, wherein a third extent in the second set of extents is located on the destination unit of storage space.

18. The method of claim 9, wherein the third extent in the second set of extents is located on the source unit of storage space.

19. A system comprising one or more computer processor circuits configured to perform a method comprising:
   selecting a data set based on the data set being spread across a quantity of units of storage space that is above a unit of storage space quantity threshold;
   serializing the data set;
   identifying a list of extents in the data set;
   determining a sequential order of data in the extents in the data set;
   selecting a first plurality of extents in the data set for congregation, wherein each extent in the first plurality of extents is selected based on being below an extent size threshold;
   identifying a second plurality of extents in the data set, wherein each extent in the second plurality of extents is selected to remain at an address on a unit of storage space based on being above an extent size threshold; and
   congregating the first plurality of extents, the congregating comprising:
      moving a first extent in the first plurality of extents from a source unit of storage space to a destination unit of storage space, wherein moving the first extent causes the first extent to become consecutive with a second extent and further causes the determined sequential order of data to be reflected by a physical order of the first and the second extent on the destination unit of storage space; and
      maintaining the addresses of the extents in the second plurality of extents.

* * * * *